US007881956B2

(12) United States Patent
Kenyon et al.

(10) Patent No.: US 7,881,956 B2
(45) Date of Patent: Feb. 1, 2011

(54) METHOD, COMPUTER SYSTEM AND COMPUTER PROGRAM FOR DETERMINING A RISK/REWARD MODEL

(75) Inventors: Christopher Mark Kenyon, Langnau am Albis (CH); Thomas Bachofner, Bern/BE (CH)

(73) Assignee: International Business Machines Corporation, Armonk, NY (US)

( * ) Notice: Subject to any disclaimer, the term of this patent is extended or adjusted under 35 U.S.C. 154(b) by 1120 days.

(21) Appl. No.: 11/589,563

(22) Filed: Oct. 30, 2006

(65) Prior Publication Data

US 2007/0101165 A1 May 3, 2007

(30) Foreign Application Priority Data

Oct. 31, 2005 (EP) ................................. 05023793

(51) Int. Cl.
*G06F 9/44* (2006.01)

(52) U.S. Cl. ..................... 705/7; 705/8; 705/9; 705/10; 705/11; 700/28; 700/100

(58) Field of Classification Search .............. 705/7–11; 700/28, 100
See application file for complete search history.

(56) References Cited

U.S. PATENT DOCUMENTS 4,495,559 A * 1/1985 Gelatt et al. .................. 700/28
5,467,268 A * 11/1995 Sisley et al. .................... 705/9
6,154,849 A * 11/2000 Xia .............................. 714/4
6,219,654 B1 * 4/2001 Ruffin ........................ 705/400
6,249,769 B1 * 6/2001 Ruffin et al. ................... 705/7
6,526,387 B1 * 2/2003 Ruffin et al. ................... 705/7
7,467,095 B2 * 12/2008 Ouimet .......................... 705/7
7,603,304 B2 * 10/2009 Asthana et al. ............... 705/35
7,617,117 B2 * 11/2009 Starkey ......................... 705/7
7,668,614 B2 * 2/2010 Govind et al. ............... 700/100
2001/0027455 A1 * 10/2001 Abulleil et al. .............. 707/102
2003/0149657 A1 * 8/2003 Reynolds et al. .............. 705/38
2004/0068431 A1 * 4/2004 Smith et al. ................... 705/10
2004/0098300 A1 * 5/2004 Karwatowski et al. ........ 705/11

(Continued)

OTHER PUBLICATIONS

Fitzgerald et al. (Fitzgerald, Guy; Willcocks, Leslie; "Contracts and Partnerships in the Outsourcing of IT" International Conference on Information Systems, 1994).*

(Continued)

*Primary Examiner*—Romain Jeanty
*Assistant Examiner*—Alan Miller
(74) *Attorney, Agent, or Firm*—Cantor Colburn LLP

(57) ABSTRACT

Determining a risk/reward model for a service provided by a service provider to a serviced entity where a value function for the service is dependent on at least one value parameter, and comprises provision of a serviced entity base case being characteristic for at least one serviced entity value parameter without provision of a service and provision of a set of projects and their interdependencies being eligible for providing the service, each project having and impact on a subset of one or both of the at least one serviced entity value parameter and at least one service provider value service. The risk/reward model is determined by way of performing a selection of the sets of projects resulting in a selection set, further the model provides a risk/reward line, the risk/reward line is characteristic for whether a reward or penalty is accredited to the service provider depending on achieved results.

3 Claims, 5 Drawing Sheets

U.S. PATENT DOCUMENTS

2004/0225549 A1* 11/2004 Parker et al. .................. 705/8
2004/0236591 A1* 11/2004 Johnson et al. ................ 705/1
2005/0119959 A1* 6/2005 Eder .......................... 705/36
2005/0198047 A1* 9/2005 Garcia et al. ................ 707/100
2006/0080119 A1* 4/2006 Hegmann et al. .............. 705/1
2006/0112022 A1* 5/2006 Andres et al. ............... 705/400
2007/0073430 A1* 3/2007 Govind et al. ................. 700/99

OTHER PUBLICATIONS

DiRomauldo, Anthony, & Gurbaxani, Viijay. (1998). Strategic Intent for IT Outsourcing. UC Irvine: Center for Research on Information Technology and Organizations. Retrieved from: http://escholarship.org/uc/item/7kc4d3p1.*

* cited by examiner

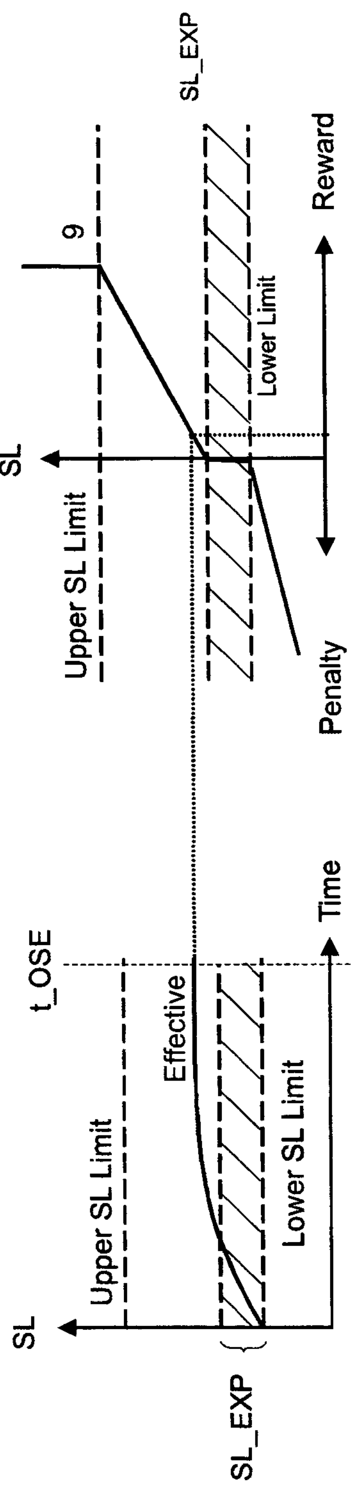
Fig.4
SL
Upper SL Limit
Effective
Lower SL Limit
SL_EXP
t_OSE
Time
Fig. 5
SL
Upper SL Limit
SL_EXP
Lower Limit
9
Reward
Penalty
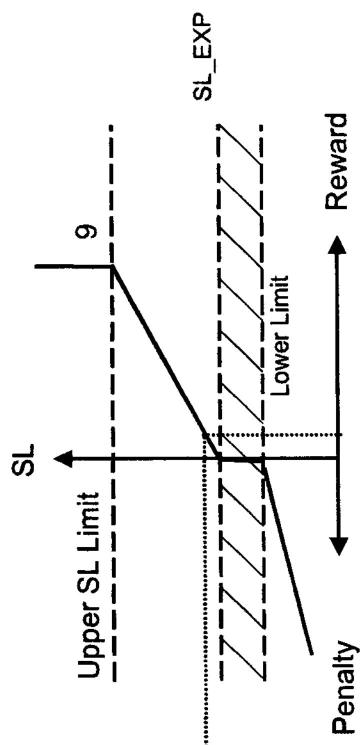
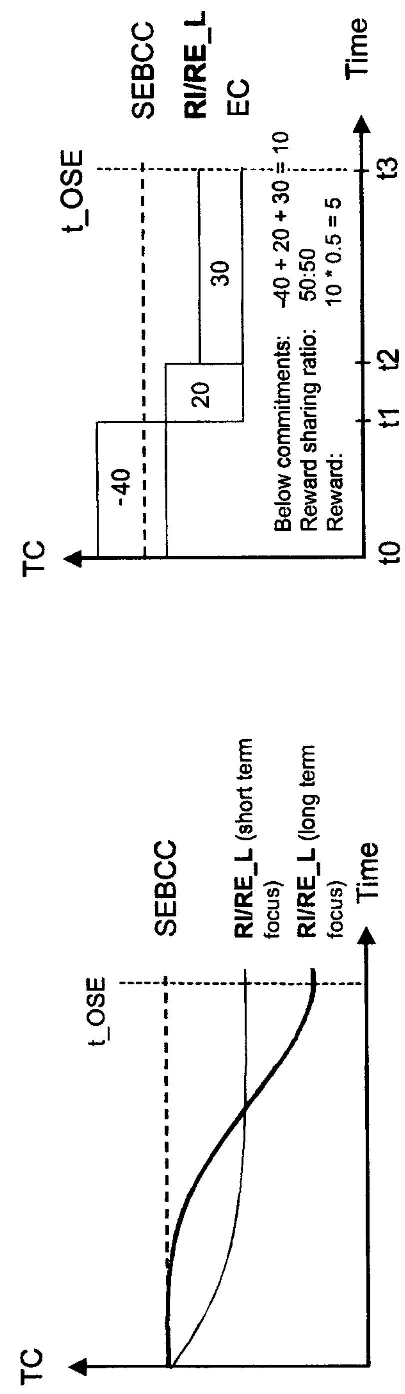
Fig. 6
TC
t_OSE
SEBCC
RI/RE_L (short term focus)
RI/RE_L (long term focus)
Time
Fig. 7
TC
t_OSE
SEBCC
RI/RE_L
EC
-40
20
30
Below commitments: -40 + 20 + 30 = 10
Reward sharing ratio: 50:50
Reward: 10 * 0.5 = 5
t0
t1
t2
t3
Time

METHOD, COMPUTER SYSTEM AND COMPUTER PROGRAM FOR DETERMINING A RISK/REWARD MODEL

TECHNICAL FIELD

The present invention relates to a method for determining a risk/reward model for a service to be provided by a service provider to a serviced entity. It further relates to a computer program which is adapted to determine a risk/reward model when run on a computer and to a corresponding computer system.

BACKGROUND OF THE INVENTION

A transformation of a complex infrastructure, such as an information technology transformation, in some organizational unit is a very complex task and involves many projects to be carried out.

It is therefore a challenge to provide a method for determining a risk/reward model for a service to be provided by a service provider to a serviced entity which enables a good success, for the service provider and for the serviced entity, of the service to be provided. It is further a challenge to provide a computer program product which is adapted to determine a risk/reward model when run on a computer and which enables a good success of the service to be provided.

SUMMARY OF THE INVENTION

According to a first aspect of the invention, a method is provided for determining a risk/reward model for a service to be provided by a service provider to a serviced entity. It comprises provision of a service provider value function for the service being dependent on at least one service provider value parameter. It further comprises provision of a serviced entity value function for the service being dependent on at least one serviced entity value parameter. It further comprises provision of weighting values for the serviced entity value function. The method further comprises provision of a serviced entity based case being characteristic for at least one serviced entity value parameter without provision of the service by the service provider. It further comprises provision of a set of projects and their interdependencies being eligible for providing the service, each project having a given impact on a subset of one or both of the at least one serviced entity value parameter and at least one service provider value parameter. It further comprises determining the risk/reward model by way of performing a selection of the set of projects, resulting in a selection set, taking into consideration the serviced entity value function, the weighting value for the serviced entity value function, the service provider value function, the weighting value for the service provider value function and the serviced entity and the serviced entity base case. The risk/reward model provides a risk/reward line for the service to be provided relative to at least one serviced entity value parameter. The risk/reward line is characteristic for whether a reward or a penalty is accredited to the service provider depending on achieved results relative to the risk/reward line. The first aspect is distinguished by that an alignment of interests between the service provider and the serviced entity may be obtained which then enables the success of the service.

According to a preferred embodiment of the first aspect, the risk/reward model also provides the selection set. In this way, the service may be provided according to the selection set and also the selection set may be part of a contract between the service provider and the serviced entity and ensures in that way transparency of the service to be provided.

According to a further preferred embodiment of the first aspect, the serviced entity value parameters comprise a short-term gain and long-term gain. In this way, objectives of the serviced entity may be met on the time scale valued by the serviced entity.

According to a further preferred embodiment, the service provider value parameter comprises constraints concerning business metrics. In this way, the service provider's non-negotiable given values of business metrics may easily be ensured to be respected. In this respect, it is advantageous, if the business metrics comprise one of or a combination of a cash negative measure, return on investment, time to cash positive or value at risk. Additionally these constraints may be relaxed by providing appropriate value functions for their breach.

According a further preferred embodiment of the first aspect of the invention, the determination of the risk/reward model further comprises optimizing the sequence of the projects, of the selection set. In this way, an even better optimization may be obtained.

According to a further preferred embodiment of the first aspect of the invention, the method comprises determining the risk/reward model dependent on at least one uncertainty measure for each project concerning the impact of the respective project. The at least one uncertainty measure may be, by way of example but nonetheless not limited to, a standard deviation. In this way, the risk/reward line may be determined more appropriately.

In this context, it is particularly advantageous if the impact of the respective product comprises a time-to-effect and/or effect magnitude.

According to a further preferred embodiment of the first aspect of the invention, the serviced entity base case provides base case costs and/or base case service levels and/or base case service values. In this way, an appropriate optimization may be obtained.

According to a further preferred embodiment of the first aspect of the invention, the method comprises provision of a risk share and/or a reward share between the service provider and the serviced entity and determining the risk/reward model dependent on the risk share and/or the reward share. In this way, a variable risk share and/or reward share may be taken into consideration and in this way a further improved optimization may be accomplished.

According to a further preferred embodiment of the first aspect of the invention, the method comprises the provision of an active service time period of the service to be provided by the service provider and determining the risk/reward model dependent on the active service time period. In this way the risk/reward model may even be more precise and the optimization may even be further improved.

According to a further preferred embodiment of the first aspect of the invention, the method further comprises provision of a transition time period beginning right after the active service time period and determining the risk/reward model dependent on the transition time period. The transition time period is preferably a duration after completion of all the projects from the selection set or at least when no new projects are started. By this embodiment, it may be ensured that even close to the end of the active service time period, new projects may be started which have a positive impact during the transition time duration. In this way, in particular the serviced entity's needs may be better met.

According to a further preferred embodiment of the first aspect of the invention, the service concerns at least part of the serviced entity's information technology environment.

According to a second aspect of the invention there is provided a computer system comprising means for carrying out the steps of the method or its preferred embodiments according to the first aspect of the invention.

According to a third aspect of the invention there is provided a computer program comprising instructions for carrying out the steps of the method or its preferred embodiments according to the first aspect of the invention when this computer program is executed on a computer system.

The advantages of the first aspect of the invention and its preferred embodiments correspond to the advantages of the second and third aspect of the invention.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating:

FIG. 4, a service level diagram,

FIG. 5, a service level value function diagram,

FIG. 6, a third total cost diagram,

FIG. 7, a fourth total cost diagram,

Elements of the same design or function are referred to with the same reference numerals.

DETAILED DESCRIPTION OF THE DRAWINGS

Figure 1:
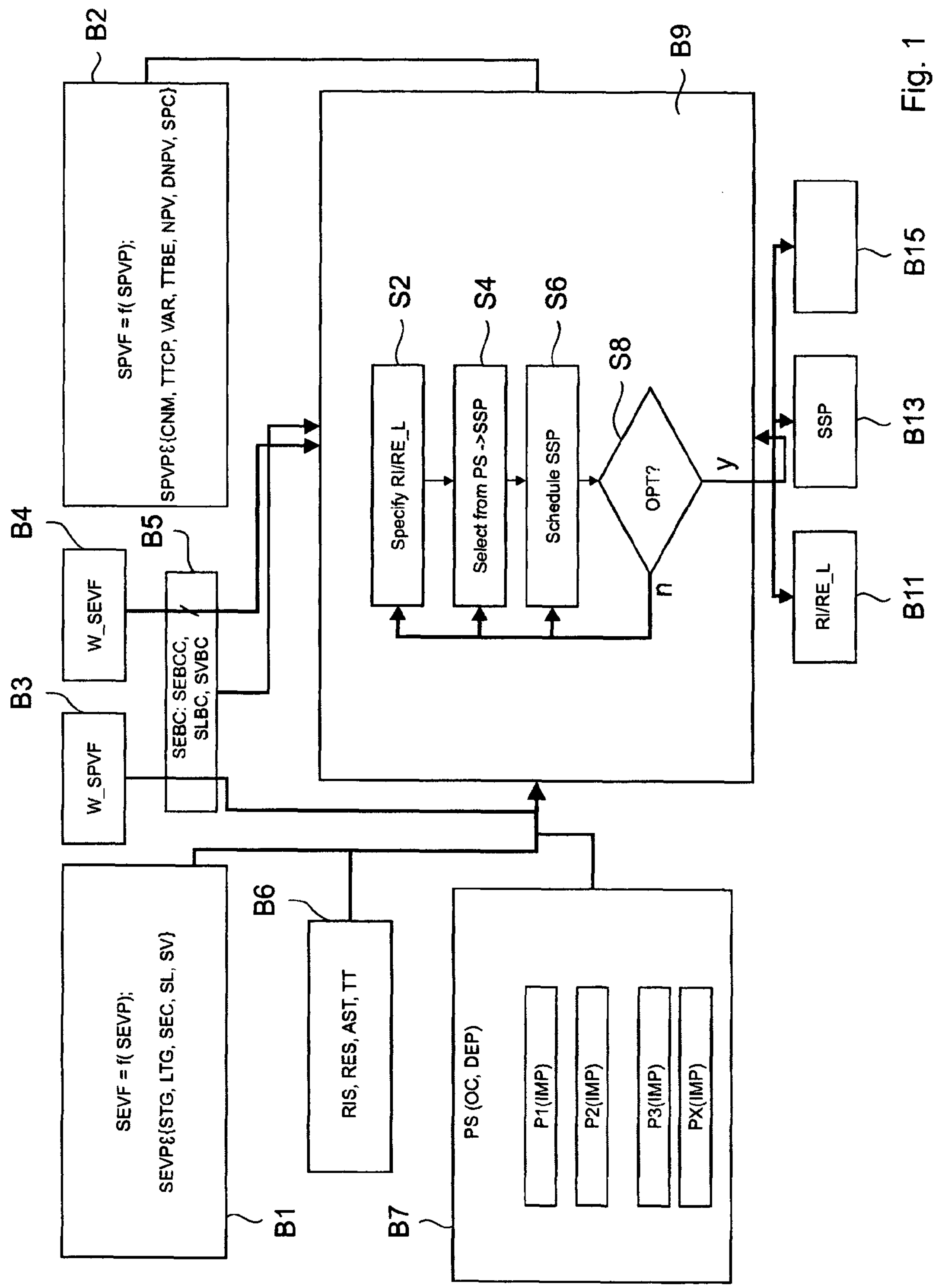
FIG. 1, a block diagram for determining a risk/reward model.

A service provider may enter an engagement with a serviced entity to provide a service, which may include, for example, to transform part of the serviced entity's information technology environment. Typically, such an engagement comprises many different projects P1-PX, which may have an uncertain outcome and a given uncertain impact on a subset of one or both of an at least one serviced entity value parameter SEVP (FIG. 1) and at least one service provider value parameter SPVP, which are both explained in more detail further below. In addition to that, the projects P1-PX typically have dependencies between each other.

Such an engagement may comprise taking over management and budget responsibility by the service provider. This opens the chance to positively influence and control critical success factors, such as organizational readiness, correct skill set and sustainable orientation, in a serviced entity's information technology transformation over a time period of typically between three to five years. A good relationship, mutual trust and the serviced entity's confidence in the service provider's capabilities are prerequisites for such an engagement, which may also be referred to as a partnership. By basing this engagement on a risk/reward model, the service provider may demonstrate alignment of interests with the serviced entity and a commitment to sustainability.

An outcome of the risk/reward model may be used in a contract between the service provider and the serviced entity for setting the frame of the mutual engagement. In this context, it is helpful if the outcome of the risk/reward model is tailored to support the serviced entity's strategic business objectives. Using the outcome of the risk/reward model for the contract has the consequence that a portion of a risk inherent with the engagement is transferred to the service provider and on the other hand, the service provider is given the opportunity to participate on the client's success. In that way, incentives are generated and may be created in such a way that the service provider and the client's business objectives are aligned and that the service provider has a reason to transform, manage, and operate the serviced entity's tangible and intangible assets in the interest of the client.

The determination of the risk/reward model is in the following explained by the aid of the block diagram in FIG. 1. With a block B1, a serviced entity value function SEVF is provided. The serviced entity value function SEVF is dependent on at least one serviced entity value parameter SEVP. The serviced entity value parameter SEVP may be, for example, a short-term gain STG and a long-term gain LTG or serviced entity costs SEC, a service level SL, or a service value SV. The serviced entity value function represents the way a change in the respective serviced entity value parameters SEVP is appreciated by the serviced entity. The serviced entity value function SEVF should be provided from, or constructed with, the serviced entity and in that way reflects the appreciation of changes in the serviced entity value parameters SEVP.

An example of a respective serviced entity value function SEVF considering a change in the service level SL is shown in FIG. 5. An expected service level range SL_EXP may be agreed upon between the serviced entity and the service provider as a target to be reached during the provision of the service by the service provider. If then a lower limit of the service level is not reached, this results in a penalty incorporated in the service level value function 9 that is part of the calculation of the actual total cost (TC in FIG. 6). If, however, the expected service level range is exceeded, then an increasing award is incorporated in the calculation of the actual total cost (TC in FIG. 6), which increases until an upper service level limit is reached. A further increase of the service level is no longer additionally honored by the serviced entity. t_OSE denotes an on site end, standing for the point of time where the active engagement and therefore the active service time period AST is finished.

The short-term gain STG and the long-term gain LTG are also reflected in the serviced entity value function SEVF and should reflect the serviced entity's objective concerning the time horizon's benefits of the service to be provided, which should be aimed at. An appreciation of a short-term gain may result in a cost cutting on short notice, whereas a long-term gain appreciation by the serviced entity may result in an aim at a low cost level at the end of the engagement. By defining the value function, also any feasible combination between long-term gain LTG and short-term gain STG may be represented.

A service provider value function SPVF is provided in a block B2, the service provider value function SPVF being dependent on at least one service provider value parameter SPVP. The service provider value parameter SPVP may be, for example, a cash negative measure CNM, a time to cash positive TTCP, a time to break even TTBE, a net present value NPV, a distribution of the net present value DNPV, a value at risk VAR or service provider costs SPC. It may, for example, also comprise return on investment. In the service provider value function SPVF one or more of the service provider value parameters SPVP may preferably be expressed as constraints concerning business metrics, for example, the return on investment must be greater than a given amount or do not go more into the cash negative measure CNM than a further amount of money. Also, a further constraint may be comprised in the service provider value function SPVF expressing the time to cash positive TTCP, that is the time when the service provider starts getting money and a net flow is coming its direction, should not exceed a given time span. A further service provider value parameter SPVP may be the value at risk VAR, for example, based on the Basel I agreement. The value at risk may also be limited by way of a further constraint. These constraints may be hard or soft. A hard constraint must be respected. A soft constraint includes a (proportional) penalty for the breach of the constraint. The service provider value function SPVF represents the appreciation of the service provider to changes in the service provider value parameters SPVP or expectations to the values of the service provider value parameters SPVP.

A service provider weighting value W_SPVF and, respectively, a serviced entity weighting value is provided in blocks B3 and, respectively, B4. The service provider and serviced entity weighting values W_SPVF, W_SEVF have an influence on how the serviced entity value function SEVF and the service provider value function SPVF are weighted when determining the risk/reward model's output. The service provider weighting value W_SPVF and the serviced entity weighting value W_SEVF are used by the service provider to obtain a range of optimal solution about which to negotiate with the serviced entity.

In a block B5, a serviced entity base case SEBC is provided, which is characteristic for at least one serviced entity value parameter SEVP without provision of the service by the service provider. The serviced entity base case SEBC should represent the present and projected course of the at least one serviced entity value parameter SEVP without the provision of the service by the service provider. By the serviced entity base case SEBC, for example, one or more of the following may be provided: serviced entity base case costs SEBCC, base case service level SLBC, base case service value SVBC. The serviced entity base case SEBC is provided by the serviced entity. Usually this will be at least one cost and at least one service level.

The service level SL may by way of example be in the case of a search machine on the Internet an expected time for obtaining results.

With a block B6, a risk share RIS, reward share RES, an active service time period AST and possibly a transition time period TT are provided. In the course of determining the risk/reward model, a risk/reward line RI/RE_L is provided by the model relative to at least one serviced entity value parameter SEVP. If the actual course of the respective serviced entity value parameter during the active service time period AST and/or the transition time period TT differs from the risk/reward line RI/RE_L, the risk is taken over by the service provider according to the risk share RIS, whereas if things go better, then given by the risk/reward line RI/RE_L, the service provider receives the given reward share RES. The risk share RIS and the reward share RES may be subject to negotiations prior to the engagement between the serviced entity and the service provider.

Also, the active service time period AST and, optionally, the transition time period TT are subject to negotiations. Provision of the transition period TT may ensure sustainability effects of the service to be provided. The transition time period TT is a duration of time after completion of all projects P1-PX or when no new projects P1-PX are started. The transition time duration TT starts directly after the active service time period AST has finished. The risk/reward line RI/RE_L determined by the risk/reward model extends over the transition time period TT and therefore risk and reward sharing is also possible during the transition time period TT, which establishes sustainability of effects of the service to be provided by the service provider.

Figure 2:
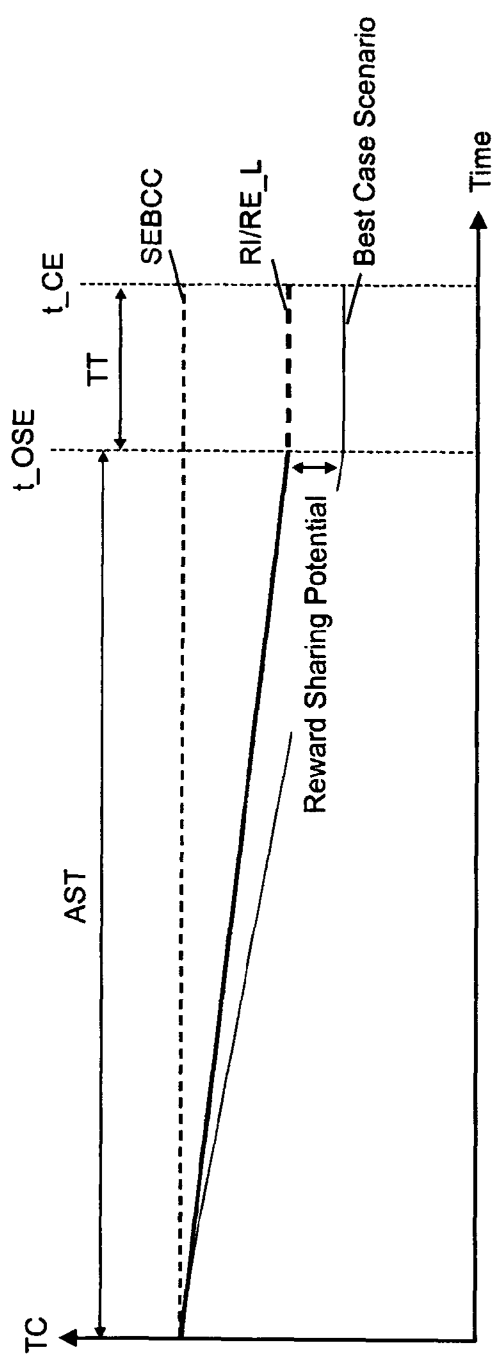
FIG. 2, a first total cost diagram.
Figure 3:
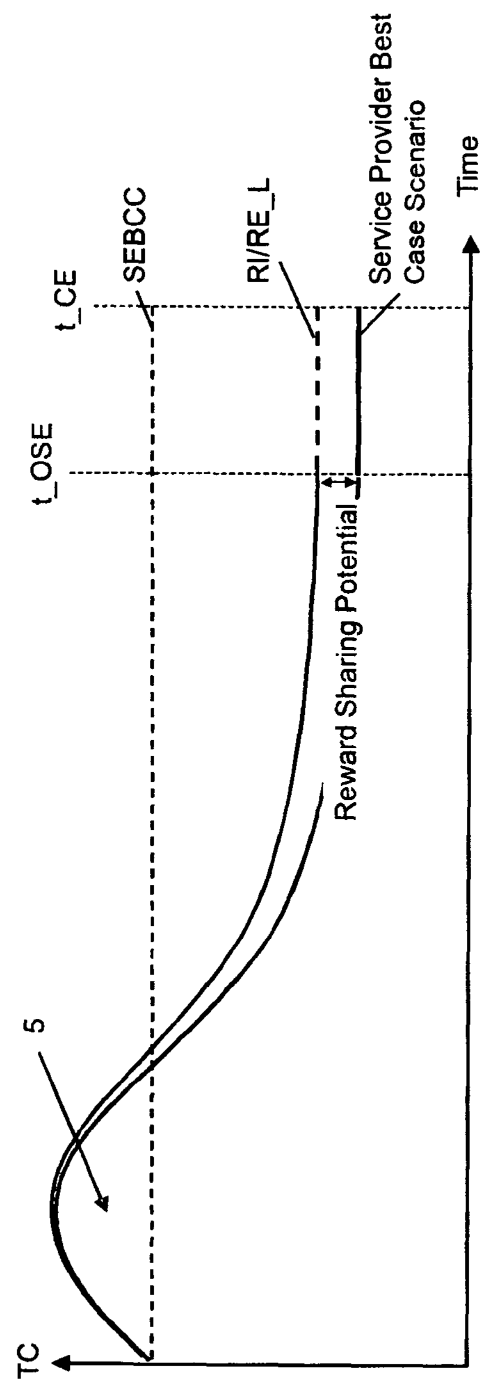
FIG. 3, a second total cost diagram.

Examples of risk/reward lines RI/RE_L are shown by way of example in the FIGS. 2 and 3. TC denotes total cost, that is the serviced entity costs SEC and the service provider costs SPC. 5 denotes service provider investments.

With the block B7, a set PS of projects P1-PX is provided, being eligible for providing the service or transition service. Each project P1-PX has a given impact IMP on a subset of one or both of the at least one serviced entity value parameter SEVP and at least one service provider value parameter SPVP. With the set of projects PS, also overall constraints OC and dependencies DEP are provided with block B7. The overall constraints and/or the dependencies may reflect an availability or disposal of manpower or in particular the availability of experts or certain limitations on when new projects may not be started, for example, close to quarter closings or product launches. The set PS of project P1-PX comprises various projects P1-Px, each having a given but from project P1-PX to project P1-PX possibly different impact IMP. Typical projects include server consolidation, consolidation of SAP instances, redesign of web functionality, and selective sourcing of support functions (e.g. call center for Windows support to Eastern Europe or India).

Each project P1-PX has uncertainties. Some projects may be more risky than others and their duration may be uncertain, also the cost they involve or the effect on the respective subset of one or both the at least one serviced entity value parameter SEVP and the at least one service provider value parameter SPVP may be uncertain. For that reasons, in block B7 at least one given uncertainty measure may be provided in connection to each project P1-PX, being for example a standard deviation concerning the impact IMP on the subset of one or both of the at least one serviced entity value parameter SEVP and at least one service provider value parameter SPVP. The impact may also comprise time-to-effect and/or effect magnitude.

A block B9 is designed to accomplish the determination of the risk/reward model and to output the risk/reward line RI/RE_L and receives its inputs from all the blocks B1-B7 which output the serviced entity value function, the service provider value function, the service provider weights W_SPVF, the serviced entity weights W_SEVF, the serviced entity base case SEBC, the risk share RIS, the reward share RES, the active service time period AST, the transition time period TT, the project set PS including the overall constraints OC and dependencies DEP and the projects P1-PX including the respective impact IMP, and other parameters discussed above.

Block B9 comprises an optimizer, preferably a so-called global optimizer, which preferably automatically takes into consideration all the inputs to block B9 and improves or optimizes the risk/reward line for the service to be provided relative to at least one serviced entity value parameter SEVP.

During the optimization process in a step S2, various different risk/reward lines are specified automatically. In a step S4, projects P1-PX from the set PS of projects P1-PX are selected, forming a selection set SSP. Every time step S4 is executed, preferably a different project P1-PX is selected for forming the selection set SSP. Then in a step S6, the projects from the selection set SSP are each scheduled, that is respective starting points for the respective projects P1-PX are specified automatically using the global optimizer, e.g. Tabu Search. Then in a step S8, it is evaluated whether optimization criteria OPT are satisfied. The optimization criteria are derived from the serviced entity value function SEVF and its associated serviced entity weighting value W_SEVF, the service provider value function SPVF and its associated service provider weighting value W_SPVF, the serviced entity base case SEBC, the risk share RIS, the reward share RES, the active service time period AST, the transition time period TT, the overall constraints OC concerning the projects and their dependencies DEP and the impact IMP of the projects P1-PX of the selection set SSP.

If in step S8 it is determined that the optimization criteria OPT are not met, then it is proceeded to one of the steps S2, S4 or S6. For example, various permutations of the scheduling of the selection set SSP concerning the scheduling of the respective projects P1-PX may take place prior to again changing the selection of projects P1-PX in the selection set SSP. In the same way, then as an outer loop, the selection set may be varied by running step S4 consecutively before the risk/reward line RI/RE_L is changed in a further outer loop in step S2. However, the order of the steps S2-S6 may also be different, especially their consecutive run may be varied in a different way. Preferably, the risk/reward line RI/RE_L is determined by respective use of a suited optimization tool such as tabu search If it is determined in step S8 that the optimization criteria OPT are met, then the optimization is finished and the last specified risk/reward line RI/RE_L is provided as an output in a block B11. The risk/reward line may, for example, be related to the serviced entity costs SEC. The risk/reward line may, however, also be related to the service level SL or the service value SV and it is also feasible that various risk/reward lines RI/RE_L are determined in block B9 and then outputted in block B11. It should be noted that the determination of the optimization criteria in step S8 may also only take into consideration an arbitrary sub-set of the above-mentioned terms or sizes.

A further output of block B9, if the optimization criteria OPT are met in step S8, is a selection set SSP, provided in a block B13 and determined when running step S6 the last time before the optimization criteria OPT were satisfied in step S8. In addition to that, the risk/reward model may be designed such that it also improves or optimizes the risk share RIS and/or the reward share RES. In this case, a respective step for automatically specifying various values for the risk share RIS and/or the reward share RES are provided in block B9. In this case, it is not necessary to input the risk share RIS or, respectively, the reward RES share from block B6. However, the risk share RIS and the reward share RES are often negotiated outside the automatic process of the optimization in block B9 and are therefore given. For example, the reward share may be 50%, whereas the risk share may be 100% with the service provider. Further outputs of block B9 may be provided in a block B15.

The risk/reward model may also be applied to a different service to be provided by the service provider, such as by way of example the restoration of a house or, for example, the development of a new leisure complex or also other services.

FIG. 6 shows different risk/reward lines RI/RE_L which are outputs from block B9 depending on whether the serviced entity has a high preference for a short-term gain STG or rather a high preference for a long-term gain LTG.

In the course of checking the optimization criteria OPT in Block B9, also the transition time period TT and the active service time period AST may be taken into consideration. FIG. 7 shows an exemplary risk/reward line RI/RE_L being output in block B11 and further exemplary effective costs EC during the provision of the services by the service provider. In this case, the reward share RES is assumed to be 50%. In a period of time between points of time t0 and t1, the commitments set by the risk/reward line RI/RE_L are not met, which results in a −40 value. Then, in the further time period between points of time t1 and t2, the effective costs are below the risk/reward line RI/RE_L resulting in a reward value of 20. In a further time period between the points of time t2 and t3, the effective costs also lie under the risk/reward line RI/RE_L which results in a reward value of 30. The overall reward then results in reward of five taking into consideration the reward sharing ratio.

Figure 8:
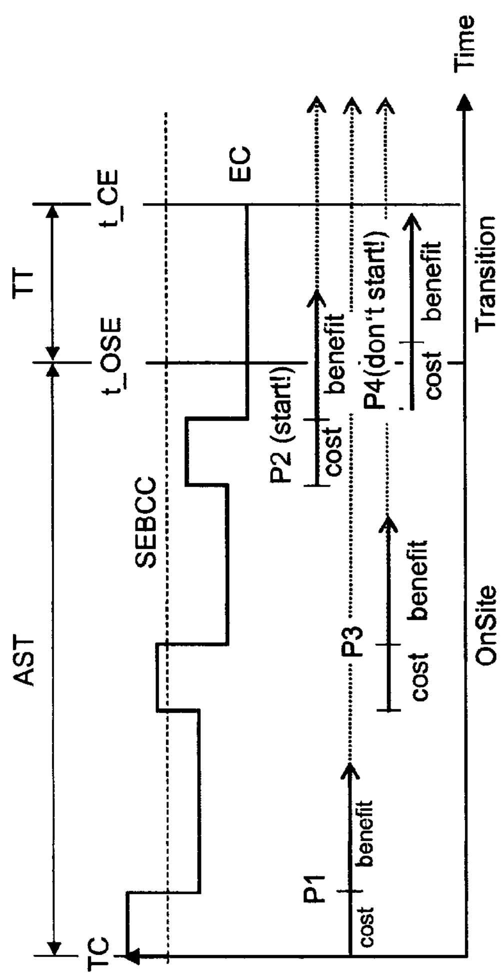
FIG. 8, a fifth total cost diagram.

FIG. 8 shows a further development of the total cost TC over time. As an example, projects P1, P3, P2 and P4 are shown. It is also indicated the respective phases of the respective projects P1 to P4 involving costs and, respectively, benefits. Due to the provision of the transition time period TT, the project P2 is started even though its benefit phase is partly after the active service time period AST. In this way, the serviced entity profits from the benefits from the project P2 and the service provider has an incentive to start project P2 as the service provider also benefits from the benefits provided by the project P2 during the transition time period TT. Project P4 would be determined to not be started as its benefit phase would protrude too long into the transition time period and taking into consideration given uncertainties related to the project P4, the incentive for the service provider would not be enough to start P4.

Figure 9:
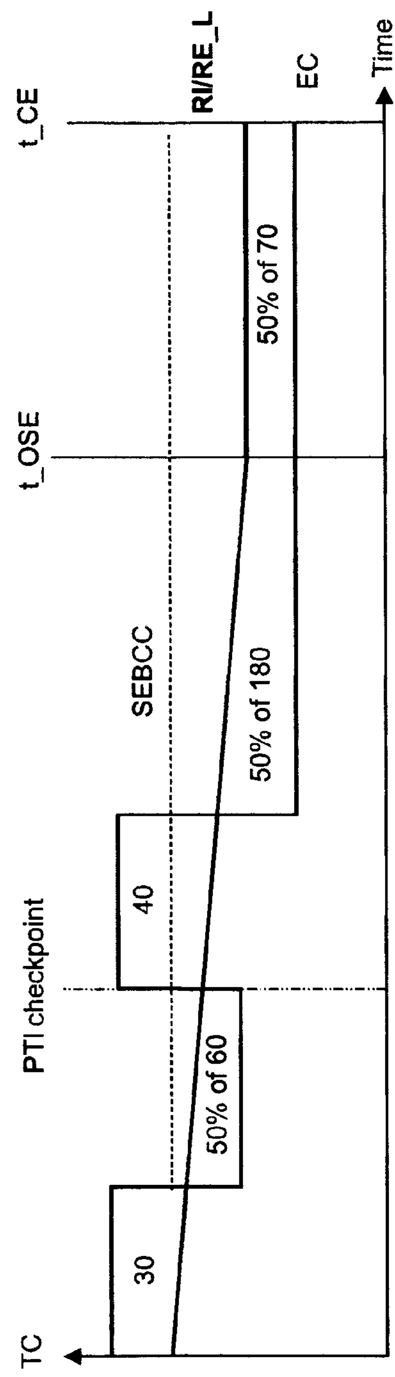
FIG. 9, a sixth total cost diagram.

FIG. 9 shows a further example of effective costs versus the risk/reward line RI/RE_L over time. In this case, a PTI checkpoint is given, which refers to a pretax income checkpoint.

The whole process for determining the risk/reward model for the service to be provided including then actually providing the service may be as follows. A common understanding of the serviced entity base case SEBC is established. Potential projects are identified, for example, resulting in the set of project PS. The serviced entity's contract requirements and preferences are identified. Then, the block diagram's actions and steps are performed according to the block diagram in FIG. 1. After that, a project solution definition may take place i.e. detailed implementation planning. A delivery sign-off, a quality assurance sign-off and a finance sign-off may take place. Then, negotiations take place, resulting in the signing of a contract regulating the terms including the risk/reward line RI/RE_L. During the active service time period AST, ongoing change requests and adaptations may be necessary, possibly resulting in a new determination of the risk/reward model.

Concerning the serviced entity base case costs SEBCC, the aspects the service provider is responsible for and on the other hand those aspects the service provider is not responsible for should be specified. Examples for the aspects the service provider may not be responsible for, may be, for example, software license costs from third parties.

The projects P1-PX may be, for example, cost-cutting projects, quality improvements projects such as service level improvement or transformation projects. Cost-cutting and quality improvement projects should be assessed in a uniform framework. They might have significant implications for the serviced entity. The two types of projects compete with each other for inclusion in the selection set SSP. If there are very good cost-cutting possibilities, then one will not do many quality improvement projects. Thus, one will require exceptional rewards to include quality improvement projects when there are good costcutting projects available. The serviced entity's requirements for minimal quality improvement may also be handled outside of the risk/reward model.

Preferably, the 80:20 rule is applied for the value functions and the quality optimization projects, i.e. it is focused on the most important aspects to the serviced entity and to the service provider.

Figure 10:
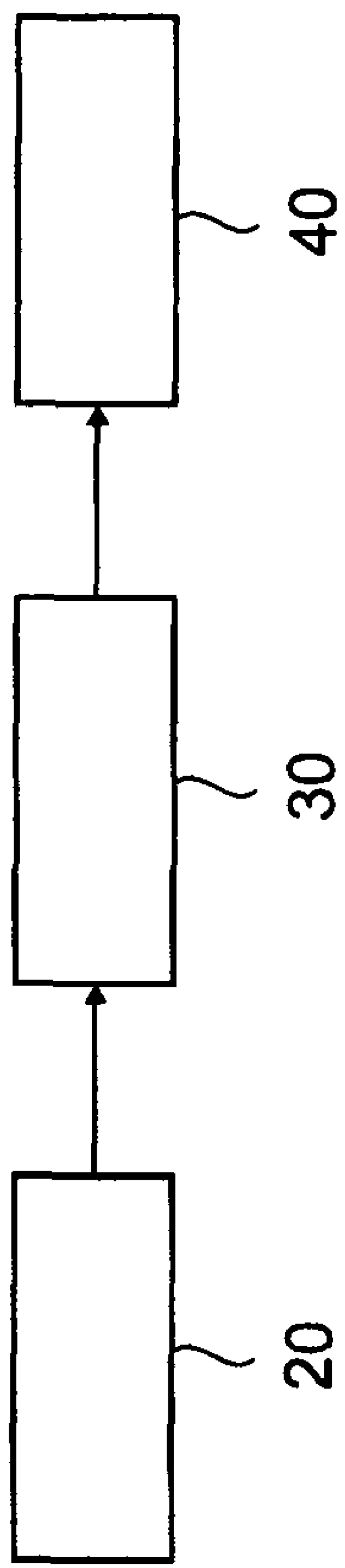
FIG. 10, a computer system.

FIG. 10 shows a computer system with a first unit 20 which serves as an input unit for inputting the data provided to block B9 in FIG. 1. It further comprises a second unit 30 for running a computer program for doing the optimization that is described in the context of block B9. For that purpose a respective memory and a processor may be provided. A third unit is an output unit for outputting the results from block B9 such as the risk/reward line RI/RE_L or the selection set SSP.

The invention claimed is:

1. A computer implemented method for determining a risk/reward model for a service to be provided by a service provider to a serviced entity comprising:

receiving a service provider value function for the service from the service provider, the service provider value function being dependent on at least one service provider value parameter, the service concerns at least part of the serviced entity's information technology environment;

receiving a serviced entity value function for the service from the serviced entity, the serviced entity value function being dependent on at least one serviced entity value parameter;

receiving weighting values for both the serviced entity value function and the service provider value function;

receiving a serviced entity base case from the serviced entity, the serviced entity base case representative of the at least one serviced entity value parameter without provision of the service by the service provider;

receiving a set of projects and their interdependencies from the serviced entity, the set of projects and their interdependencies being eligible to the service provider to perform, each project having a given impact on the at least one serviced entity value parameter or the at least one service provider value parameter;

determining the risk/reward model through performing and optimizing a selection of the set of projects, resulting in a selection set, the performing and optimizing based on optimization criteria derived from the serviced entity value function, the weighting value for the serviced entity value function, the service provider value function, the weighting value for the service provider value function, the serviced entity base case, a risk share and/or a reward share between the service provider and the serviced entity, an active service time period of the service to be provided by the service provider, and a transition time period beginning right after the active service time period; and outputting a risk/reward line for the service to be provided relative to the at least one serviced entity value parameter, and the risk/reward line represents whether a reward or penalty is accredited to the service provider depending on achieved results relative to the risk/reward line, the risk reward line being derived from the risk reward model, wherein the steps of receiving, determining and outputting are performed by a computer.

2. A computer program product comprising a non-transitory computer readable media having tangible computer code thereon for determining a risk/reward model for a service to be provided by a service provider to a serviced entity by the method of:

receiving a service provider value function for the service from the service provider, the service provider value function being dependent on at least one service provider value parameter, the service concerns at least part of the serviced entity's information technology environment;

receiving a serviced entity value function for the service from the serviced entity, the serviced entity value function being dependent on at least one serviced entity value parameter;

receiving weighting values for both the serviced entity value function and the service provider value function;

receiving a serviced entity base case from the serviced entity, the serviced entity base case representative of the at least one serviced entity value parameter without provision of the service by the service provider;

receiving a set of projects and their interdependencies from the serviced entity, the set of projects and their interdependencies being eligible to the service provider to perform, each project having a given impact on the at least one serviced entity value parameter or the at least one service provider value parameter;

determining the risk/reward model through performing and optimizing a selection of the set of projects, resulting in a selection set, the performing and optimizing based on optimization criteria derived from the serviced entity value function, the weighting value for the serviced entity value function, the service provider value function, the weighting value for the service provider value function, the serviced entity base case, a risk share and/or a reward share between the service provider and the serviced entity, an active service time period of the service to be provided by the service provider, and a transition time period beginning right after the active service time period; and outputting a risk/reward line for the service to be provided relative to the at least one serviced entity value parameter, and the risk/reward line represents whether a reward or a penalty is accredited to the service provider depending on achieved results relative to the risk/reward line, the risk/reward line being derived from the risk/reward model.

3. A computer system for determining a risk/reward model for a service to be provided by a service provider to a serviced entity, comprising:

a central processor unit, memory, and input/output, said memory having computer code thereon for configuring and controlling the computer system configured to perform the steps of:

receiving a service provider value function for the service from the service provider, the service provider value function being dependent on at least one service provider value parameter, the service concerns at least part of the serviced entity's information technology environment;

receiving a serviced entity value function for the service from the serviced entity, the serviced entity value function being dependent on at least one serviced entity value parameter;

receiving weighting values for both the serviced entity value function and the service provider value function;

receiving a serviced entity base case from the serviced entity, the serviced entity base case representative of the at least one serviced entity value parameter without provision of the service by the service provider;

receiving a set of projects and their interdependencies from the serviced entity, the set of projects and their interdependencies being eligible to the service provider to perform, each project having a given impact on the at least one serviced entity value parameter or the at least one service provider value parameter;

determining the risk/reward model through performing and optimizing a selection of the set of projects, resulting in a selection set, the performing and optimizing based on optimization criteria derived from the serviced entity value function, the weighting value for the serviced entity value function, the service provider value function, the weighting value for the service provider value function, the serviced entity base case, a risk share and/or a reward share between the service provider and the serviced entity, an active service time period of the service to be provided by the service provider, and a transition time period beginning right after the active service time period; and outputting a risk/reward line for the service to be provided relative to the at least one serviced entity value parameter, and the risk/reward line represents whether a reward or penalty is accredited to the service provider depending on achieved results relative to the risk/reward line, the risk reward line being derived from the risk reward model.

* * * * *